of Nitric Acid, of which the follow-
UNITED STATES PATENT OFFICE.

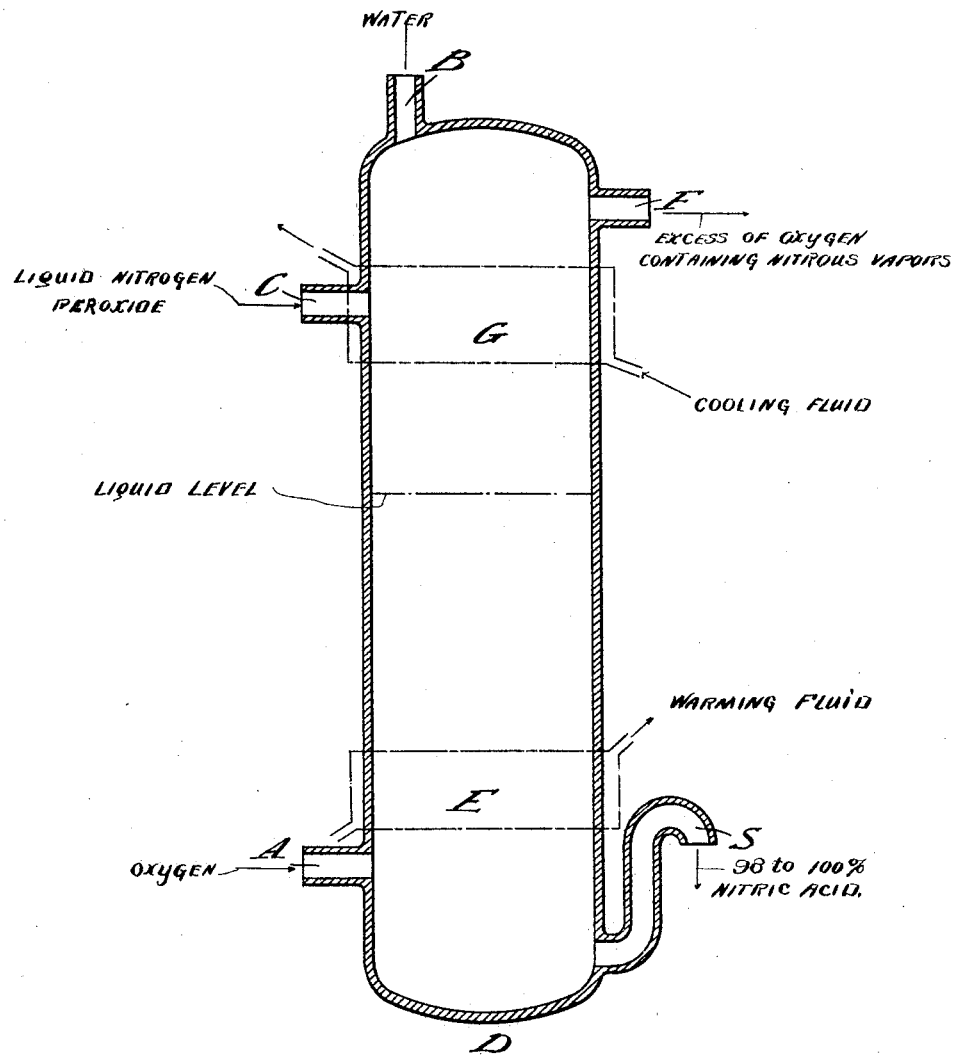

PHILIPPE AUGUSTE GUYE, OF GENEVA, SWITZERLAND, ASSIGNOR TO FERDINAND GROS & BOUCHARDY, OF PARIS, FRANCE, A FIRM.

MANUFACTURE OF NITRIC ACID.

1,407,530.   Specification of Letters Patent.   Patented Feb. 21, 1922.

Application filed May 29, 1918. Serial No. 237,326.

*To all whom it may concern:*

Be it known that I, PHILIPPE AUGUSTE GUYE, a citizen of the Swiss Republic, residing in Geneva, Switzerland, have invented a certain new and useful Improved Manufacture of Nitric Acid, of which the following is a specification.

The direct transformation of nitrogen peroxide, $NO_2$, into concentrated nitric acid has frequently been attempted. The well known process of recovering nitrous vapours by their reaction with water and atmospheric oxygen in washing towers yields, under the best conditions, an acid containing only 52 per cent of $HNO_3$; according to Foerster and Koch (Zeitschrift für angewandte Chemie, 1908, 2168) the substitution of oxygen for air raises the concentration to 68 per cent of $HNO_3$. Another process seems to attain more nearly to perfection; it consists in treating liquid nitrogen peroxide with dilute nitric acid or water, the peroxide being in sufficient excess to bring about a formation of two immiscible layers, one containing acid of 98–100 per cent strength, the other acid of 75–90 per cent strength.

The present invention is based on investigations which show that the desired change occurs quite differently and much more simply if a very large excess of liquid nitrogen peroxide is caused to react with water in constant presence of an atmosphere of oxygen; for this gas air may be substituted if from time to time excess of nitrogen is eliminated. It has been found that when one uses at least 15 parts by weight of nitrogen peroxide to 1 part by weight of water, the aqueous phase remains constantly saturated with $NO_2$; the volume of the $NO_2$ diminishes at first quickly and then more and more slowly, and there are obtained at the end of a certain period of time two immiscible liquid phases, easily separated, one of which is about four-fifths of the total volume and consists of concentrated nitric acid containing 98–100 per cent of $HNO_3$ and about its own volume of dissolved $N_2O_4$, while the other (about one-fifth of the total volume) is formed of liquid nitrogen peroxide containing a little nitric acid (about 2–5 per cent) and sometimes traces of nitrous acid. In other words, and by way of accurate differentiation of these features from those of the aforesaid process using liquid nitrogen peroxide, the reaction proceeds from one end to the other with an aqueous phase saturated with $NO_2$ and the final equilibrium is not characterized by two immiscible phases both consisting of nitric acid of different concentration, but of two phases consisting essentially, one of nitric acid of 98–100 per cent strength containing about its own weight of dissolved $NO_2$, the other of nitrogen peroxide retaining only a small proportion of $HNO_3$; at the ordinary temperature and at rest, the two liquid phases separate into an upper layer consisting of the peroxide and a lower layer consisting of the concentrated nitric acid.

When the final equilibrium of this heterogeneous system has been attained, the concentrated nitric acid is separated from the nitrogen peroxide. This may be done in several ways, such as—(1) by separating the two immiscible liquid phases by decantation or siphoning and distilling the nitric acid phase; (2) by distilling the heterogeneous mixture of the two phases, preferably under reduced pressure, whereby all the $NO_2$ not used may be recovered easily. The part not distilled, after the nitrogen peroxide has been expelled, then consists of nitric acid of high concentration (98–100 per cent $HNO_3$); the recovered nitrogen peroxide is sufficiently pure for use in a further operation.

In the procedure so far recounted, the same phenomena are observed if dilute aqueous nitric acid be substituted for the water, account being taken only of the weight of water which it contains in determining the weight of $NO_2$ required; in this case there must be taken, in excess of the minimum of 15 parts by weight of $NO_2$ per one part by weight of water, a weight of $NO_2$ at least equal to the weight of $HNO_3$ contained in the aqueous acid used, so as to ensure saturation of the aqueous phase with $NO_2$.

It may be added that the reactions that occur under the conditions which have been described require a fairly long time when it is desired to obtain concentrated nitric acid of high content of $HNO_3$; an energteic agitation, an elevated temperature (the best being about 30° C.) and the use of oxygen compressed up to 20 atmospheres, constitute factors which diminish the duration of reaction, although within limits fairly restricted; the reaction always requires a certain number of hours and at least a moderate agitation.

Under comparable initial conditions leading to an acid of 98 per cent strength, the agitation being moderate, the following periods of reaction have been noted:—

| Temperature. | Pressure of oxygen. | Period of reaction. |
| --- | --- | --- |
| 20° C | 1 atm | 31 hours. |
| 20° C | 5 atm | 7 hours. |
| 20° C | 10 atm | 4 hours. |

The invention based on the foregoing observations consists in a process for making highly concentrated nitric acid by causing to react on water in presence of oxygen, peroxide of nitrogen in sufficient excess to maintain the aqueous phase saturated with $NO_2$ until the end of the reaction, it may be at least in the ratio of 15 parts by weight of peroxide of nitrogen to 1 part by weight of water at the ordinary temperature, until the two immiscible liquid phases formed under these conditions consists principally of highly concentrated nitric acid (98–100 per cent $HNO_3$) and nitrogen peroxide, respectively. The nitric acid is then separated from the nitrogen peroxide. For this purpose the operation may be either of the following:— (1) By known methods (for instance decantation or siphoning) the nitric acid of high concentration, which forms a layer distinct from that constituted by the excess of nitrogen peroxide is separated; the latter may be used directly and without any treatment, for a fresh operation, while the concentrated acid in the nitric acid layer is obtained by distilling the $NO_2$ contained in it, or by expelling this $NO_2$ by means of a current of oxygen. (2) The mixture of the two immiscible liquids is distilled directly; when the nitrogen peroxide (available for a new operation) has been expelled, there remains the highly concentrated nitric acid.

In practising the invention the working may be intermittent or continuous; there follows an example of each mode.

*Intermittent working.*—15 parts by weight of liquid nitrogen peroxide and 1 part by weight of water are introduced into an autoclave having an agitator, and the autoclave is put into communication with a reservoir of oxygen under ordinary pressure. The agitator is started and the reaction is allowed to proceed until a sample drawn from the layer containing the concentrated nitric acid shows the desired concentration, for instance 98–100 per cent $HNO_3$. The mixture of the two liquids ($HNO_3$ and $NO_2$) is then withdrawn and the concentrated nitric acid separated in the manner indicated above; or the mixture may be left at rest, the two layers separated and the concentrated nitric acid purified by removing from it the $NO_2$ it contains, as already prescribed.

*Continuous working.*—Into a vertical column adapted for the bubbling of gas through a liquid (illustrated diagrammatically in the accompanying drawing) is passed at the lower part, as at A, a current of oxygen, at the upper part, as at B, a current of water and at a somewhat lower level than the latter, as at C, a current of liquid nitrogen peroxide; the two liquids are introduced in the proportion of 1 molecular weight of $H_2O$ to 1 molecular weight of $N_2O_4$. Before starting the apparatus there is introduced an excess of liquid $N_2O_4$, which is maintained during the operation so that in the bubbling portion between C and A the quantity of $N_2O_4$ relatively to the water is always at least in the ratio 15:1. Under these conditions it is easy to control the process in such a manner that there gathers in the bottom of the apparatus concentrated nitric acid of 98–100 per cent strength; the latter flows regularly through the delivery pipe S. To free the nitric acid from nitrogen peroxide the temperature in the part of the apparatus marked E may be slightly raised; in presence of oxygen and at about 50°–60° C., this elimination of the peroxide from the nitric acid is practically complete. In this case the part marked G may be cooled to condense the nitrogen peroxide. The excess of oxygen, containing nitrous vapours, escapes at F and may be returned to the apparatus at A.

It should be added that the reactions which take place under the conditions described must be continued for a time long enough to obtain concentrated nitric acid containing a high percentage of $HNO_3$; energetic agitation and increase in temperature, preferably around 30°, and the use of compressed oxygen at about 20 atmospheres pressure constituting factors which shorten the time of the reaction; this always requires a certain number of hours, and at least moderate stirring. The use of air or compressed oxygen in place of air or oxygen of the ordinary pressure aid particularly in accelerating the reaction.

Where the word "water" is used in the claims I intend to include water per se as well as water containing some nitric acid.

Having thus fully described the nature of my invention and the best means I know of carrying the same into practical effect, I claim:—

1. The process of making concentrated nitric acid which consists in chemically reacting upon water and oxygen with such an excess of liquid nitrogen peroxide as is sufficient to keep the resulting aqueous phase saturated with nitrogen peroxide until the end of the reaction which takes place, the reaction being caused to take place at a temperature of about 30° C., and allowing the reaction to continue until there are two phases, one consisting substantially of nitric acid of high concentration and the other consisting substantially of nitrogen peroxide.

2. The process of making concentrated nitric acid which consists in chemically reacting upon water and oxygen with such an excess of liquid nitrogen peroxide as is sufficient to keep the resulting aqueous phase saturated with nitrogen peroxide until the end of the reaction which takes place, the oxygen admitted to the reaction mass being fed thereto under a pressure up to 20 atmospheres, and allowing the reaction to continue until there are two phases, one consisting substantially of nitric acid of high concentration and the other consisting substantially of nitrogen peroxide.

3. The process of making concentrated nitric acid which consists in chemically reacting upon water and oxygen with liquid nitrogen peroxide, the nitrogen peroxide present having substantially 15 times the weight of the water, and allowing the reaction which takes place to continue until there are two phases, one consisting substantially of nitric acid of high concentration and the the other consisting substantially of nitrogen peroxide.

4. The process of making concentrated nitric acid which consists in chemically reacting upon water and oxygen at a temperature of about 30° C. with liquid nitrogen peroxide, the nitrogen peroxide having at least 15 times the weight of the water, and allowing the reaction which takes place to continue until there are two phases, one consisting substantially of nitric acid of high concentration and the other consisting substantially of nitrogen peroxide.

5. The process of making concentrated nitric acid which consists in chemically reacting upon water and oxygen with liquid nitrogen peroxide, the nitrogen peroxide having at least 15 times the weight of the water and the oxygen fed to the reaction mass being compressed up to 20 atmospheres, and allowing the reaction which takes place to continue until there are two phases, one consisting substantially of nitric acid of high concentration and the other consisting substantially of nitrogen peroxide.

6. The process of making concentrated nitric acid which consists in chemically reacting upon water and oxygen with nitrogen peroxide, the reaction being caused to take place at a temperature of about 30° C. within an autoclave, the oxygen being in the gaseous phase and at a pressure up to 20 atmospheres, the amount of peroxide of nitrogen present being at least 15 times the weight of the water present, and allowing the reaction to continue until there are two phases, one consisting substantially of nitric acid of high concentration and the other consisting substantially of nitgrogen peroxide.

In testimony whereof I have signed my name to this specification in the presence of two subscribing witnesses.

PHILIPPE AUGUSTE GUYE.

Witnesses:
LOUIS H. MUNNIER,
J. DIVINNE.